United States Patent [19]

Lawrence et al.

[11] 4,343,863

[45] Aug. 10, 1982

[54] DRAG REDUCING SKI WAX

[75] Inventors: Rodney G. Lawrence, Howell, Mich.; Patrick T. Morelli, Denver, Colo.

[73] Assignee: Petrolite Corporation, St. Louis, Mo.

[21] Appl. No.: 153,382

[22] Filed: May 27, 1980

[51] Int. Cl.³ ............................................... B32B 9/04
[52] U.S. Cl. .................................... 428/485; 106/270; 106/10
[58] Field of Search ............... 106/270, 271, 272, 10; 260/28.5 R, 28.5 A; 428/485, 484

[56] References Cited

U.S. PATENT DOCUMENTS

| | | | |
|---|---|---|---|
| 2,290,393 | 7/1942 | Thomas | 260/28 |
| 2,577,816 | 12/1951 | Schneider | 260/28.5 |
| 3,048,551 | 8/1962 | Lutz | 260/28.5 |
| 4,239,546 | 12/1980 | Russell et al. | 106/270 |

*Primary Examiner*—Allan Lieberman
*Assistant Examiner*—Patricia Short
*Attorney, Agent, or Firm*—Sidney B. Ring; Hyman F. Glass

[57] ABSTRACT

This invention relates to a ski wax containing sufficient poly(alpha-olefin) to assist ski in reducing drag, i.e., reducing the friction between the ski running surface base layer and the snow.

18 Claims, No Drawings

DRAG REDUCING SKI WAX

Skis are generally made by a sandwich construction, wherein the top surface, sidewall, and a bonded, bottom, ski running surface base cover reinforcing layers, which may comprise fiberglass, Dacron, rayon or cotton cloth, used alone or impregnated with epoxy, polyester or other suitable adhesive resin. On the sides of the reinforcing layers, aluminum edge protectors may be provided. A core, which is highly flexible in high performance skis, can be a hollow or solid plastic core of epoxy resin reinforced fiberglass, a lightweight epoxy, polystyrene or polyurethane foam or an aluminum honeycomb, is surrounded by a top surface layer, a bottom ski surfacing base layer and sidewalls between the top surface and base.

The wax of this invention is particularly useful on ultra-high high performance skis, and is applied directly, as an exterior coating, to the ski running surface base layer that will come into direct friction contact with snow. The less the friction, the less the ski drag. The ski wax of this invention reduces ski drag, i.e, the friction between the ski running surface base layer and the snow. The ski base layer can comprise epoxy resin, polyurethane resin, melamine resin, polyvinyl alcohol resin, polyvinyl chloride resin, polypropylene resin, polytetrafluoroethylene resin, polyester resin, polyethylene resin, and wood.

Ski running surfaces made from polyethylene, epoxy, polyurethane, polyvinylalcohol, polyvinylchloride, polypropylene and polytetrafluoroethylene plastics, are well known and taught by Kennedy in U.S. Pat. Nos. 3,272,522 and 3,416,810. The running surface may contain a lubricating filler such as powdered graphite or molybdenum disulfide. This outer surface is generally bonded to the ski body, which may be a solid polymeric foam, with a catalyzed adhesive impregnated Dacron, fiberglass or cotton cloth reinforcement.

While such particulate lubricant inclusion helps to reduce drag, between the ski running surface and the snow, the spaced apart particles do not provide a continuous lubricating surface. They also tend to easily wear off the ski surface due to friction with the snow.

Dissel, in U.S. Pat. No. 2,494,531, in attempting to solve ski drag problems, taught a combination lacquer-wax, containing bayberry or paraffin wax, nitrocellulose, and the calcium salt of dioctyl-succinic acid. This provided a very adherent, easily replaceable wax, having a very low coefficient of friction, which could be easily applied to the running surfaces of a ski.

In a related area, Beard, In U.S. Pat. No. 3,785,841, taught a wax combination, containing paraffin wax and ethyl cellulose or an oleyl amide resin. This provided a very adherent wax, that was moisture repellent, had a low adhesion to snow, and was particularly useful on snow shovels.

U.S. Pat. No. 4,126,481 provides a wax composition, especially suitable for use on skis, comprising a rigid wax matrix which is not water soluble, and is effective to adhere to the ski bottom and remain adherent and a hard solid, without melting, at up to about 10° C.; and from about 3 wt. % to about 45 wt. % of a thermoplastic, water soluble polymer disposed within the wax matrix. The water soluble polymer is preferably selected from polyacrylamide, carboxy methyl cellulose, sodium carboxyl methyl cellulose, polysaccharide, guar gum, vinyl pyridine, poly(ethylene oxide) and their mixtures. The wax is effective to provide a surface on the ski bottom wherein the water soluble polymer will be leached out of the rigid wax matrix upon contact with water, to provide a boundary lubricant between the wax and the snow, ice or water.

We have now discovered that ski drag can be reduced by incorporating poly(alpha-olefin) into a wax formulation which is normally suitable as a ski wax.

A wide variety of waxes, including natural waxes, petroleum waxes and synthetic wax substitutes, etc., can be employed in preparing ski wax provided they are insoluble in water.

Useful waxes include microcrystalline wax, bayberry wax, paraffin wax, carnauba wax, montan wax, beeswax, candelilla wax, ozocerite wax, ceresin wax, wax substitutes such as polyalkylenes, for example polyethylene, polypropylene, etc., and their mixtures. Any other suitable wax may be used which is not water soluble, and which in the formulation is effective to adhere to the ski base layer and remain adherent and a hard solid, without melting, at temperatures from about $-18°$ C. to about 10° C., so that the ski wax is effective in dry powdery snow and wet snow. Many waxes are commercially available for specific use under various snow conditions as ski waxes. Effective amounts of suitable binders, stiffeners, dispersing agents, extenders and coloring pigments may also be added to the wax.

A suitable ski wax can be prepared by blending microcrystalline and paraffin wax in varying amounts, for example, in certain microcrystalline to paraffin ratios of from about 90 to 10 to 10 to 90 weight percent, such as from about 80 to 20 for cold snow conditions (i.e. $-10°$ F. to 15° F.), such as, certain ratios from about 50 to 40 for medium snow (i.e. 15° F.–25° F.), such as certain ratios from about 20 to 80% for warm snow conditions (i.e. 25° F.+).

The optimum ratio of micro to paraffin wax will depend upon varying factors such as the skis, the temperature, the type of snow such as whether it is dry or wet, etc.

The particular wax employed will vary with snow conditions, i.e., whether the snow is cold, medium, wet, dry, powder, etc. For optimum performance a special wax is formulated for each condition. However, in practice it is highly desirable to formulate a ski wax which will perform well over all or most conditions. This is particularly true in the ski rental business.

In certain instances, it may be desirable to add polyethylene to the micro-paraffin formulation. The advantage of polyethylene is that it tends to plasticize the wax formulation, making the film less brittle. Therefore sufficient polyethylene may be added to the micro-paraffin base wax formulation to plasticize the film. The amount will vary depending on various factors such as the ratio of micro to paraffin, in the snow conditions, etc. In general, one can add about 2 to 20% by weight of polyethylene to the micro-paraffin base wax, such as from about 10 to 16, but preferably about 11 to 13, expressed as weight % of the micro-paraffin base wax.

In the case of wet snow, the optimum polyethylene range is about 5 to 7%, for medium snow the optimum range is about 10 to 11% and for cold snow about 15 to 18%.

The preferred polyethylene employed has an mp of about 215° to 230° F.

We have now discovered that the addition of the poly(alpha-olefin) to ski waxes generally enhances the effective temperature-condition range of the particular base wax. For example, if a ski wax is suitable for dry and/or wet, cold, medium, or warm snow conditions, its versatility will be extended over a wider temperature or wet or dry snow conditions.

The amount of poly(alpha-olefin) employed in the base wax formulation will vary widely depending on many factors such as the type of ski, the temperature, the wet or dry condition of the snow, the temperature-condition range desired, the basic wax formulation, etc. Thus, the weight percent of poly(alpha-olefin) employed should be sufficient to optimize skiing performance and to reduce ski drag. Thus, the weight % of poly(alpha-olefin) can vary from about 0.5 to about 10%, such as from about 1 to 7.5%, for example from about 2 to 6%, but preferably about 2 to 4%. These weight percentages are based on the total wax base.

The poly(alpha-olefins) of this invention are prepared in the manner of U.S. Pat. No. 2,937,129 which is, by reference, incorporated into the present application as if part hereof.

These comprise primarily liquid alpha-olefins polymerized in the presence of a free radical catalyst at low pressure but sufficient to keep the reactants and product from vaporizing. In practice, one employs temperatures of from about 40° to 250° C. and pressures of less than about 500 psi for a period of 7 to 20 half-lives of the free radical catalyst, and a molar ratio of free radical catalyst to hydrocarbon of about 0.005 to 0.35.

Alpha-olefins which may be polymerized to obtain the polymers of this invention include alpha-olefins of the formula $RCH=CH_2$ where R is a hydrocarbon group, such as where R has 3–18 carbons, for example 5 to 15 carbons, but preferably 8 to 12 carbons. Typical alpha-olefins include the following: hexene-1, heptene-1, octene-1, decene-1, undecene-1, dodecene-1, tetradecene-1, etc.

A typical liquid poly(alpha-olefin) is prepared according to U.S. Pat. No. 2,937,129. Specifically, dodecene-1 was polymerized according to the procedure of Example 3 of U.S. Pat. No. 2,937,129 which is incorporated herein as if part hereof.

VYBAR ®825 which is prepared in the manner of Example 3 of U.S. Pat. No. 2,937,129 is a commercial poly(alpha-olefin) polymer of the Bareco Division of Petrolite Corporation, having the following properties.

The following examples are presented for purposes of illustration and not of limitation.

EXAMPLES

A base wax was prepared by blending the ratios of microcrystalline and paraffin waxes as indicated in the Table.

The wax blend was heated to 240° F.–250° F. and mixed well to insure a homogeneous blend. Overheating was avoided.

Where indicated, poly(alpha-olefin) was added to the above wax melt with good mixing to insure a homogeneous blend.

The resulting wax was tested under the skiing conditions indicated in the Table.

The microcrystalline wax employed was STARWAX ®100 sold by Bareco Division of Petrolite Corporation, having the following specifications: Mp 185° F.; Penetration @77° F., 16.

The paraffin wax employed was PACEMAKER 45 Citco paraffin with the following specifications: Mp 140.5° F.; Penetration @77° F., 13.

The poly(alpha-olefin) employed was VYBAR ®825 sold by Bareco Division of Petrolite Corporation, having the specifications stated herein in Table I. It is a liquid at room temperature.

The % of micro and % of paraffin = 100% by weight. In Table II the base wax is micro and paraffin.

The % of micro, % polyethylene, and % paraffin = 100% by weight. In Table III, the base wax is micro, polyethylene and paraffin.

The % poly(alpha-olefin) is the weight % based on base wax.

The polyethylene employed in Table III was BASF Polyethylene = Mp 227° F.; penetration @77° F., 3.

TABLE I

| Property | | Test Method | Units | VYBAR ® 825 |
|---|---|---|---|---|
| Melting Point | | ASTM D-36 Mod. | °F.(°C.) | N/A |
| Pour Point | | ASTM D-97 | °F.(°C.) | <−30(−34.4) |
| Viscosity | @32° F. (0° C.) | ASTM D-2669 | Centipoise | 6400 |
| | @50° F. (10° C.) | | | 2800 |
| | @100° F. (37.8° C.) | ASTM D-3236 | | 530 |
| | @150° F. (65.6° C.) | | | 157 |
| | @210° F. (98.9° C.) | | | 54 |
| | @250° F. (121° C.) | | | 31 |
| | @300° F. (149° C.) | | | 18 |
| Penetration | @77° F. (25° C.) | ASTM D-1321 | 0.1 mn | N/A |
| | @110° F. (43° C.) | | | |
| | @130° F. (54° C.) | | | |
| | @140° F. (60° C.) | | | |
| Density | @75° F. (24° C.) | ASTM D-1168 | grams/cc | 0.86 |
| | @200° F. (93° C.) | | | — |
| Iodine Number | | ASTM D-1959 | cg $I_2$/g sample | 30 |
| Color | | ASTM D-1500 | | 0.0 |

N/A Not Applicable

TABLE II

| Ex. | Wgt. % Micro | Wgt. % Paraffin | Wgt. % Poly(alpha)olefin) | Snow Conditions |
|---|---|---|---|---|
| 1 | 80 | 20 | — | Cold Snow |
| 1A | 80 | 20 | 2 | Cold Snow |
| 2 | 50 | 50 | — | Medium |
| 2A | 50 | 50 | 2 | Medium |
| 3 | 20 | 80 | — | Warm wet snow |
| 3A | 20 | 80 | 2 | Warm wet snow |

TABLE II-continued

| Ex. | Wgt. % Micro | Wgt. % Paraffin | Wgt. % Poly(alpha) olefin) | Snow Conditions |
| --- | --- | --- | --- | --- |
| 4A | 20 | 80 | 4 | |

The poly(alpha-olefin)-containing composition had less drag than the corresponding formulation having no poly(alpha-olefin).

Examples 5-8 illustrate formulations containing polyethylene (BASF Polyethylene mp 227° F.; penetration @77° F., 3. In these examples the base wax—micro plus polyethylene plus paraffin—equals 100%. VYBAR®825 is added as weight percent of the base wax.

TABLE III

| Ex. | Wgt. % Micro | Wgt. % Polyethylene | Wgt. % Paraffin | Wgt. % VYBAR® 825 | Snow Conditions |
| --- | --- | --- | --- | --- | --- |
| 5 | 70 | 10 | 20 | 2 | Cold Snow |
| 6 | 70 | 15 | 15 | 2 | |
| 7 | 55 | 20 | 35 | 2 | Medium Snow |
| 8 | 20 | 10 | 70 | 4 | Warm/Wet Snow |

We claim:

1. A ski wax containing effective amounts of microcrystalline and paraffin waxes as a wax base and a poly(alpha-olefin) in an amount which enhances the effective temperature-condition range of the particular base wax.

2. The ski wax of claim 1 containing about 1 to 10% poly(alpha-olefin) based on weight of the wax base.

3. The ski wax of claim 1 where the ratio of microcrystalline to paraffin wax is from about 80 to 20 to 20 to 80.

4. The ski wax of claim 2 where the ratio of microcrystalline to paraffin wax is from about 80 to 20 to 20 to 80.

5. The ski wax of claim 1 which also contains from about 2 to 20 weight percent polyethylene, based on wax base.

6. The ski wax of claim 2 which also contains from about 2 to 20 weight percent polyethylene, based on wax base.

7. The ski wax of claim 3 which also contains from about 2 to 20 weight percent polyethylene, based on wax base.

8. The ski wax of claim 4 which also contains from about 2 to 20 weight percent polyethylene, based on wax base.

9. The running surface of skis coated with a ski wax containing a wax base and a poly(alpha-olefin).

10. The running surface of claim 9, containing 1 to 10% of the poly(alpha-olefin) based on the weight of the wax base.

11. The running surface of skis coated with the ski wax of claim 1.

12. The running surface of skis coated with the ski wax of claim 2.

13. The running surface of skis coated with the ski wax of claim 3.

14. The running surface of skis coated with the ski wax of claim 4.

15. The running surface of skis coated with the ski wax of claim 5.

16. The running surface of skis coated with the ski wax of claim 6.

17. The running surface of skis coated with the ski wax of claim 7.

18. The running surface of skis coated with the ski wax of claim 8.

* * * * *